(12) United States Patent
Li et al.

(10) Patent No.: US 8,484,801 B2
(45) Date of Patent: Jul. 16, 2013

(54) CASTER

(75) Inventors: Xiao-Zheng Li, Shenzhen (CN); Wen-Tang Peng, Tu-Cheng (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 12/841,186

(22) Filed: Jul. 22, 2010

(65) Prior Publication Data
US 2011/0291534 A1    Dec. 1, 2011

(30) Foreign Application Priority Data

May 27, 2010   (CN) .......................... 2010 1 0184829

(51) Int. Cl.
*B60B 33/06*    (2006.01)
(52) U.S. Cl.
USPC ................................ 16/32; 16/19; 16/18 CG
(58) Field of Classification Search
USPC ..... 16/18 R, 19, 18 CG, 35, 32, 38; 280/43.14
See application file for complete search history.

(56) References Cited

U.S. PATENT DOCUMENTS

| | | | | | |
|---|---|---|---|---|---|
| 222,180 | A | * | 12/1879 | Cutting et al. | 16/32 |
| 343,031 | A | * | 6/1886 | Hunting | 16/32 |
| 1,016,324 | A | * | 2/1912 | Dunn | 16/32 |
| 1,019,302 | A | * | 3/1912 | Butcher | 16/32 |
| 1,730,788 | A | * | 10/1929 | Simon | 16/32 |
| 2,197,892 | A | * | 4/1940 | Larsen | 446/293 |
| 2,524,819 | A | * | 10/1950 | McKean | 16/32 |
| 3,441,974 | A | * | 5/1969 | Dean | 16/33 |
| 4,700,430 | A | * | 10/1987 | Raftery | 16/18 CG |
| 4,800,617 | A | * | 1/1989 | Yeh | 16/18 CG |
| 5,001,808 | A | * | 3/1991 | Chung | 16/18 CG |
| 5,813,090 | A | * | 9/1998 | Miles | 16/37 |
| 2005/0217071 | A1 | * | 10/2005 | Shinner | 16/19 |

FOREIGN PATENT DOCUMENTS

TW    M299657 U    10/2006

* cited by examiner

*Primary Examiner* — William L. Miller
(74) *Attorney, Agent, or Firm* — Altis Law Group, Inc.

(57) ABSTRACT

A caster for being mounted to a bottom of a device includes a support, a connecting member, and a wheel mounted to the connecting member. The support defines a receiving space. The connecting member is threadedly connected to the support, and comprises a bracket accommodated in the receiving space. The wheel is rotatably mounted to the bracket. The support and the connecting member are operable to rotate relative to each other, with the wheel moving to expose out of or retract inside the receiving space.

9 Claims, 4 Drawing Sheets

CASTER

BACKGROUND

1. Technical Field

The disclosure relates to casters, and more particularly to a caster attached to a cabinet for convenient moving and stabilizing of the cabinet.

2. Description of Related Art

A large device, such as a cabinet, is too heavy to move easily from one place to another place. Typically, wheels are attached to the bottom of the device to more easily move the device, but the wheels may cause the device to be unstable and too easily moved as well. Therefore, it is inconvenient for users, when the device does not need to be moved.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Figure 1:
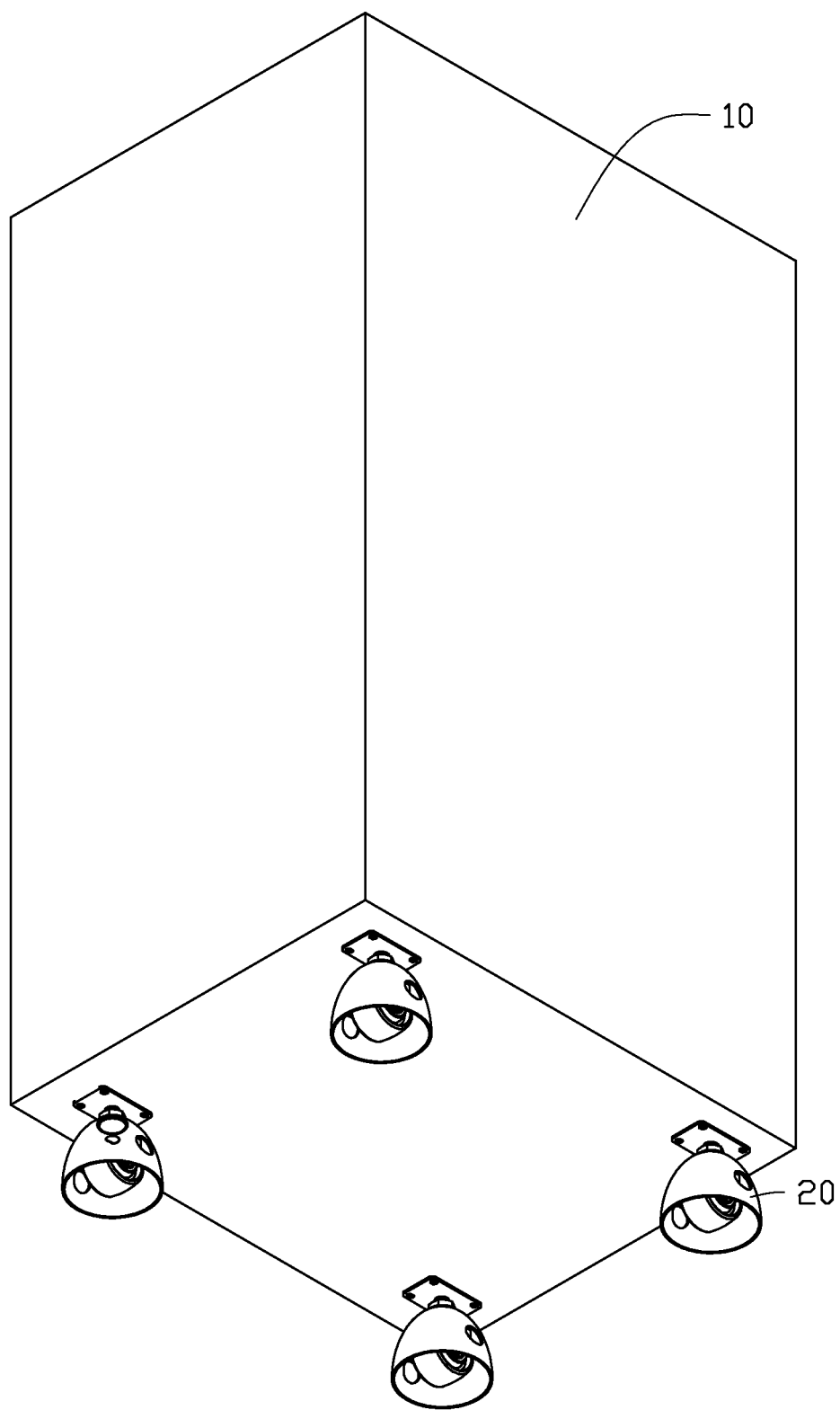
FIG. 1 is an isometric view of an exemplary embodiment of a caster, together with a device.
Figure 2:
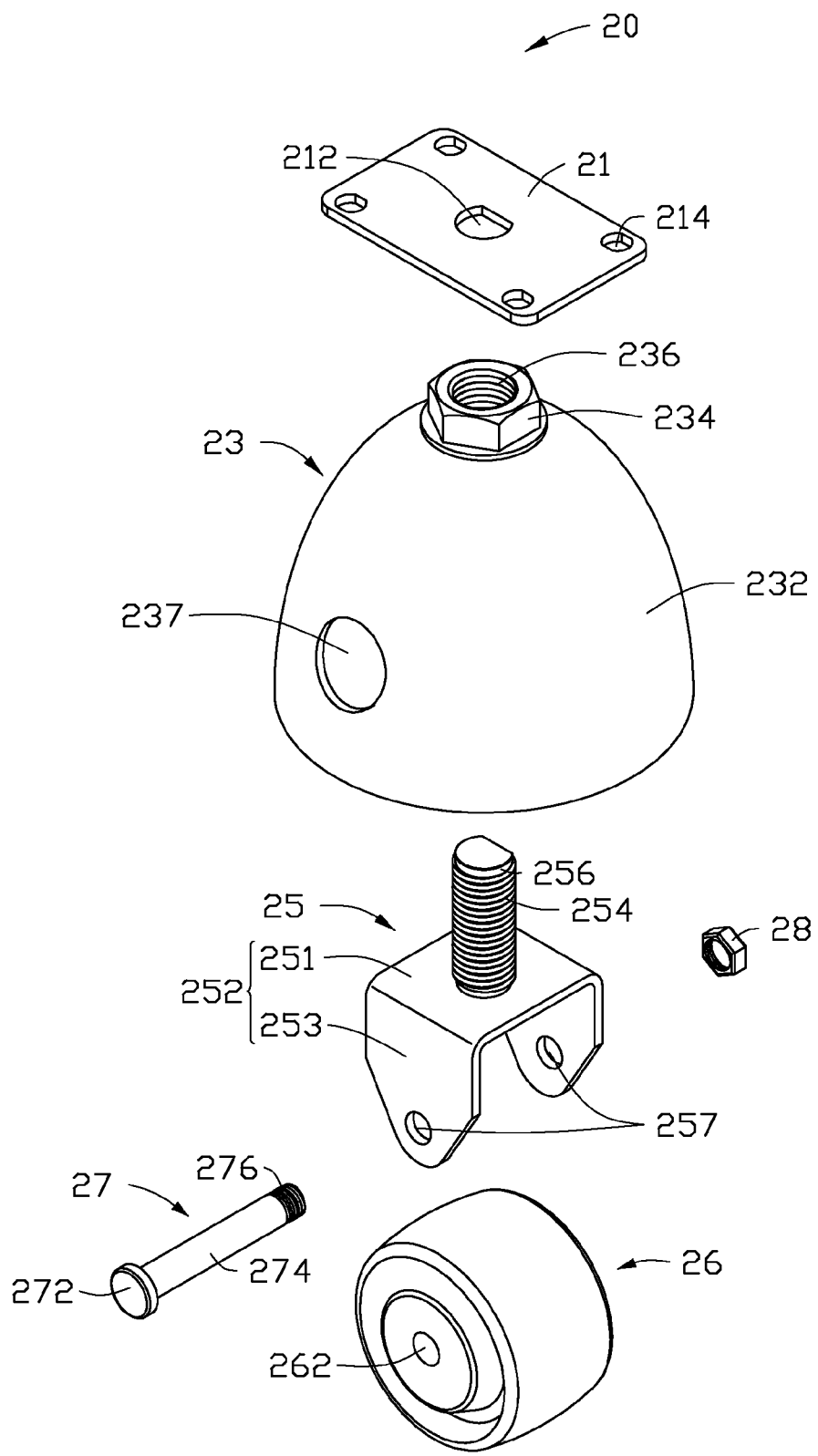
FIG. 2 is an exploded, isometric view of the caster of FIG. 1.

Referring to FIGS. 1 and 2, in an exemplary embodiment, a caster 20 is provided to be mounted to a bottom of a device 10. In this embodiment, the device 10 is a serving cabinet.

The caster 20 includes a fixing board 21, a support 23, a connecting member 25 which is threadedly connected to the support 23, a wheel 26, a fast pin 27, and a nut 28.

The fixing board 21 defines a D-shaped fastening hole 212 in a center of the fixing board 21, and a plurality of fixing holes 214 in corners of the fixing board 21.

The support 23 includes a lampshade shaped main body 232, with a circular opening (not labeled) defined in a bottom of the main body 232. An engaging portion 234, such as a nut, extends through a top of the main body 232, opposite to the opening. The main body 232 defines a receiving space 235 (shown in FIG. 3) communicating with the opening. Two opposite operating portions are formed on a circumference of the main body 232, for operating the support 23. In this embodiment, the operating portions are two through holes 237 defined in the circumference of the main body 232, both communicating with the receiving space 235. In another embodiment, the operating portions can be two tabs protruding out from the circumference of the main body 232. The engaging portion 234 defines a screw hole 236, communicating with the receiving space 235.

The connecting member 25 includes a U-shaped bracket 252 and a threaded post 254. The bracket 252 includes a beam 251 and two fixing arms 253 extending from opposite ends of the beam 251. Each fixing arm 253 defines a through hole 257, opposite to the beam 251. The threaded post 254 perpendicularly extends from the beam 251, away from the fixing arms 253. A distal end of the threaded post 254 forms a fixing end 256 with a D-shaped cross-section.

The wheel 26 axially defines a mounting hole 262.

The fast pin 27 includes a head portion 272, and a round pole 274 extending from the head portion 272. A threaded portion 276 is formed on a circumference of a distal end of the pole 274.

Figure 3:
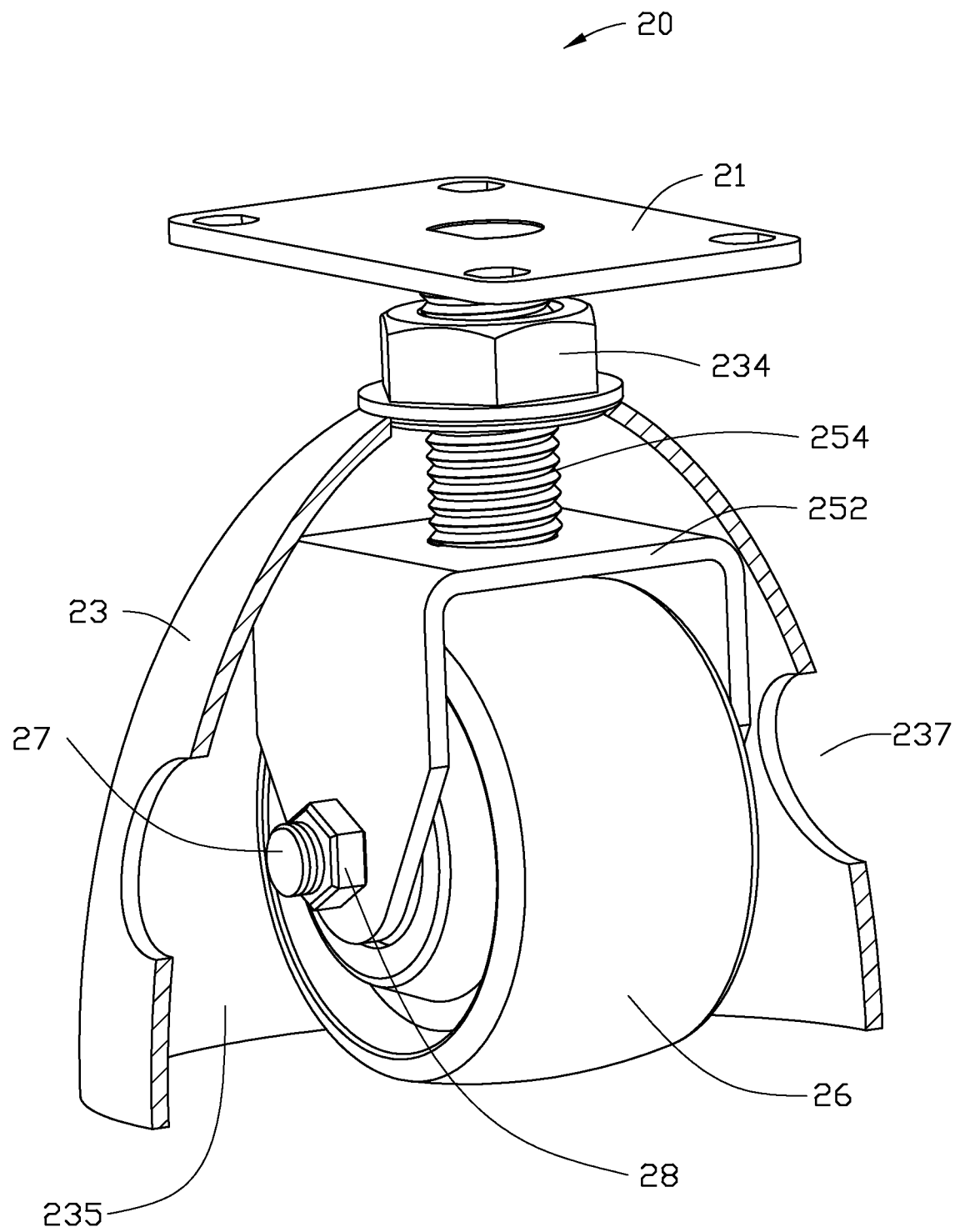
FIG. 3 is an assembled, isometric, partly cutaway view of the caster of FIG. 2.

Also referring to FIG. 3, in assembly, the wheel 26 is sandwiched between the fixing arms 253 of the connecting member 25, with the mounting hole 262 of the wheel 26 aligned with the through holes 257 of the connecting member 25. The pole 274 of the fast pin 27 extends through one of the through holes 257, the mounting hole 262, and the other through hole 257 in that order one by one, to engage with the nut 28, thereby, the fast pin 27 can be prevented from disengaging from the connecting member 25 and the wheel 26. The head portion 272 of the fast pin 27 abuts against one of the fixing arms 253, and the wheel 26 is rotatably fixed between the fixing arms 253. The threaded post 254 of the connecting member 25 is extended through the receiving space 235 and the screw hole 236 in that order. Therefore, the threaded post 254 threadedly engages in the screw hole 236, and the fixing end 256 exposes the outside of the screw hole 236 and is engaged in the fastening hole 212 of the fixing board 21. In this state, the bracket 252 of the connecting member 25 and the wheel 26 are received in the receiving space 235. The fixing board 21 is spaced from the engaging portion 234 of the support 23.

In use, several casters 20 can be utilized and mounted to the bottom of the device 10, by the fixing holes 214 of the fixing board 21 of each caster 20. When the device 10 needs to be moved, the support 23 can be rotated relative to the threaded post 254 of the connecting member 25, to lead the support 23 to move toward the device 10. Therefore, the wheel 26 can extend out of the receiving space 235 to roll on a supporting surface, such as the floor. Thus, the device 10 is more easily rolled around with the casters 20.

When the device 10 needs to be stabilized, the support 23 can be rotated away from the device 10, relative to the threaded post 254 of the connecting member 25. Therefore, the wheel 26 retracts into the receiving space 235 again, and the support 23 rest on the supporting surface or floor. The device 10 therefore, is prevented from easily rolling.

In another embodiment, the fixing board 21 can be omitted, and the caster 20 can be directly fixed to the device 10 by the threaded post 254 of the connecting member 25.

Figure 4:
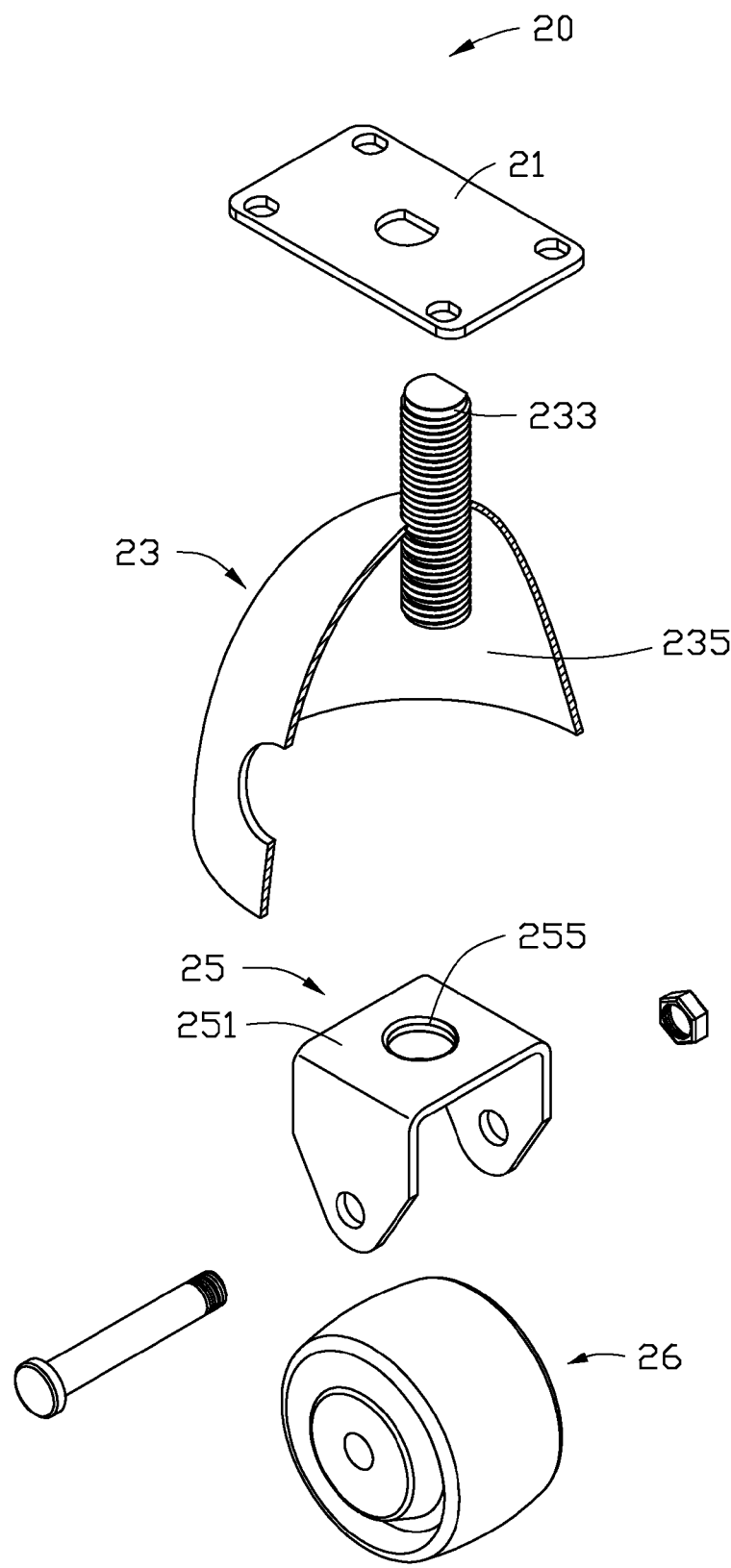
FIG. 4 is an exploded, isometric view of another embodiment of a caster.

Referring to FIG. 4, in another embodiment, the threaded post 233 extends through the support 23. A first end of the threaded post 233 extends into the receiving space 235 of the support 23, and a second end of the threaded post 233 opposite to the first end is exposed on the outside of the receiving space 235. The second end of the threaded post 233 can be fixed to the fixing board 21 or directly fixed to the bottom of the device 10. The beam 251 of the connecting member 25 defines a screw hole 255 engaged with the first end of the threaded post 233. In use, the connecting member 25 can be rotated around the threaded post 233 to position the support 23 towards or away from the device 10, with the wheel 26 being exposed out of or received inside the receiving space 235.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A caster provided to be mounted to a bottom of a device, the caster comprising:
   a support defining a receiving space;
   a connecting member threadedly connected to the support, the connecting member comprising a bracket accommodated in the receiving space; and
   a wheel mounted to the bracket of the connecting member, wherein the support and the connecting member are operable to be rotated relative to each other, with the wheel moving to expose out of or retract inside the receiving space;
   wherein the support defines a screw hole communicating with the receiving space, the connecting member comprises a threaded post extending from the bracket and engaged in the screw hole;
   wherein the support comprises a lampshade shaped main body and an engaging portion extending from a top of the main body, the receiving space is defined in the main body, the screw hole is defined in the engaging portion and communicates with the receiving space; and
   wherein the main body defines two opposite through holes communicating with the receiving space.

2. The caster of claim 1, wherein the bracket of the connecting member is U-shaped, and comprises a beam and two fixing arms extending from opposite ends of the beam, the threaded post extends from the beam, away from the fixing arms.

3. The caster of claim 2, wherein each fixing arm defines a through hole, the wheel axially defines a mounting hole, a fast pin extends through the through holes and the mounting hole to rotatably fix the wheel between the fixing arms.

4. The caster of claim 3, wherein the fast pin comprises a head portion abutting against one of the fixing arms, and a pole extending from the head portion through the through holes and the mounting hole, a distal end of the pole forms a threaded portion engaged with a nut.

5. The caster of claim 1, further comprising a fixing board for being fixed to the bottom of the device, wherein the fixing board defines a fastening hole, a fixing end is formed on a distal end of the threaded post, and the fixing end is fixedly engaged in the fastening hole.

6. The caster of claim 1, wherein the threaded post of the connecting member is extended through the screw hole of the support from the receiving space, with a distal end of the threaded post of the connecting member exposing out of the support for being fixed to the bottom of the device.

7. A caster provided to be mounted to a bottom of a device, the caster comprising:
   a support comprising a lampshade shaped main body, the main body defining a receiving space and two opposite through holes communicating with the receiving space;
   a connecting member threadedly connected to the support, the connecting member comprising a bracket accommodated in the receiving space;
   a wheel mounted to the bracket of the connecting member, wherein the support and the connecting member are operable to be rotated relative to each other, with the wheel moving to expose out of or retract inside the receiving space; and
   a fixing board, wherein the support comprises a threaded post, the threaded post has a first end and a second end opposite to the first end, the first end is received in the receiving space, and the second end is exposed out of the receiving space and fixed to the fixing board, the connecting member defines a screw hole engaged with the first end of the threaded post.

8. The caster of claim 7, wherein the connecting member comprises a beam and two fixing arms extending from opposite ends of the beam, the screw hole is defined in the beam.

9. The caster of claim 8, wherein each fixing arm defines a through hole, the wheel axially defines a mounting hole, a fast pin extends through the through holes and the mounting hole to rotatably fix the wheel to the fixing arms.

* * * * *